Patented Nov. 7, 1933

1,933,702

UNITED STATES PATENT OFFICE 1,933,702

PROCESS OF SEPARATING METALS BY SELECTIVE OXIDATION OF THE CHLORIDES

Raymond G. Brown, Niagara Falls, N. Y., assignor, by mesne assignments, to Sulphur & Smelting Corporation, a corporation of Delaware No Drawing. Application November 15, 1929
Serial No. 407,579

12 Claims. (Cl. 23—183)

This invention relates to a process for treating mixtures of anhydrous metal chlorides or materials containing mixtures of the same to effect separation of the metals from each other and from other materials with which they may be admixed.

The invention will be described with particular reference to the treatment of mixtures of non-ferrous metal chlorides, for example those of nickel, cobalt and copper, such as may be obtained in the treatment of various ores containing cobalt and nickel or nickel and copper by any of various dry chlorinating processes, e. g., those described in U. S. Patents Nos. 1,552,786, 1,898,701 and 1,898,702, as well as that described in my application Ser. No. 365,397, filed May 23, 1929.

I have found that chlorides of the kinds above mentioned when brought into the anhydrous state and subjected to the action of oxygen and chlorine in controlled ratio and at controlled temperatures may be selectively oxidized, thereby converting one or more of the chlorides into an insoluble oxid form while retaining a remaining metal or metals in the soluble chloride form. In this way the metals are put into condition for separation by known methods.

The invention will first be described as applied to the separation of cobalt from nickel, both being present initially as chlorides. If the chlorides are accompanied by large amounts of gangue, they may, if desired, be dissolved away from the gangue and crystallized from concentrated solution. The crystals may then be heated at about 110° C. or at another suitable low temperature in a vacuum or partial vacuum or in a stream of dry inert gas until completely dehydrated after which they may be treated in the same way as the chlorides derived from ore free from gangue. This separation of gangue is not necessary but is often advantageous.

The anhydrous chlorides are then heated to a temperature, usually between 400 and 550° C., and while so heated oxygen (air), in a dry state and preferably preheated to the temperature of the chlorides, is passed over the mixture. A small amount of chlorine varying from about 0.1 volume per cent. at 400° C. to 2.5 volume percent at 550° C. is added to the air introduced into the oxidizing zone. I find that under these conditions the cobalt is completely oxidized without any substantial oxidation of the nickel chloride. The solids are then withdrawn from the heating zone and cooled. The nickel chloride may then be dissolved by a suitable solvent leaving the solid cobalt oxid which is washed free from soluble nickel. The cobalt oxid may be sold as such or worked up in known ways. The solution of nickel chloride may be electrolyzed or the nickel chloride crystallized therefrom and the crystals dehydrated. Alternatively, the nickel chloride may be separated from the cobalt oxid by volatilization and subsequent condensation of the nickel chloride, usually in the presence of a stream of inert gas. This method is desirable in that it gives the nickel chloride directly in the anhydrous form ready for working up as described immediately below. The anhydrous chloride obtained by either procedure may be roasted with air at temperatures preferably higher than 450° C., whereby there are produced pure solid nickel oxid and exit gases, which gases will be the richer in chlorine the higher the temperature of operation. The chlorine in the exit gases may be utilized in known ways, by returning the same to a chlorinating cycle.

Chlorine in very dilute forms and particularly when admixed with oxygen has been considered to be of little or no commercial value, but I find that I can use very effectively the dilute gases produced by the process of this invention, not only recovering the contained chlorine but also making use of the oxygen content and of the contained heat of the gases. I do this by passing the hot gases in contact with an anhydrous chloride capable of substantially complete reaction with chlorine. I usually use a chloride of iron. With ferrous chloride I prefer to operate at temperatures between 300 and 400° C. At these temperatures the chlorine of the gases converts ferrous chloride to gaseous ferric chloride and the oxygen converts the ferrous chloride in part to iron oxid and in part to gaseous ferric chloride. The gaseous ferric chloride, substantially free from oxygen, is then utilized in known ways. It may be utilized as a chlorinating agent or it may be condensed and disposed of commercially as a solid.

Instead of using the dilute gases to produce ferric chloride and iron oxid, I may use them to produce more concentrated chlorine and iron oxid. For instance, I may produce chlorine at a concentration as high as 34%, or higher when using oxygen enriched air. In so doing, I operate at temperatures around 800 to 900° C. In the claims "air" is to be considered synonymous with "oxygen" or with "oxygen enriched air".

In Wescott Patents Nos. 1,898,701, 1,898,702 and 1,552,786, one of the steps of the respective processes involves the burning of ferric chloride vapors with air to produce ferric oxid and dilute chlorine. The exit gases arising from the operation of the herein described process may be added to the air supply specified in the Wescott patents, whereby not only the oxygen and the chlorine but also the heat in such exit gases is utilized.

The selective oxidizing process of the present invention requires that an excess of oxygen be passed through the oxidizing zone when separating nickel from copper or nickel from cobalt and in fact in the separation of most non-ferrous metals. Good results are obtained in the differential oxidation of cobalt at 400° C. when the oxygen-chlorine mixture passed into the oxidizing zone contains about 0.1 volume percent of chlorine and the outgoing gases about 0.7 volume percent; at about 450° C. the chlorine concentration of the ingoing and outgoing gases should be maintained at about 0.5 and 1.5 volume percents, respectively. At 500° C. these concentrations should be about 1.4 and 3.5 and at 550° C. these should be about 2.5 and about 7.5 volume percents, respectively.

When the separation of copper and nickel is to be effected, the process may be carried out as follows: The chlorides of these metals are brought into the anhydrous condition and then treated with an oxidizing gas (air) admixed with chlorine in such amount and introduced at such a rate that the volume percentages of chlorine in the ingoing and outgoing gases shall bear the approximate ratio indicated below at the respective temperatures specified:

| Temperature | Per cent chlorine ingoing gases | Per cent chlorine outgoing gases |
|---|---|---|
| 450° C. | .5 | 2 |
| 500° C. | 1.3–1.4 | 3.5 |

Operating under the conditions above set forth, oxidation of the copper to a state of commercially complete insolubility can be effected without substantial oxidation of the nickel chloride. When the oxidation is completed the mixture of solids may be separated by such methods as outlined above with respect to cobalt and nickel.

The concentration of chlorine in the ingoing gases should be positively controlled. If it is too low, the products are likely to be impure; if it is too high there is loss of efficiency. The percentage of chlorine in the outgoing gases on the other hand depends upon the rate of flow and numerous other factors, but with any given mixture of chlorides, and constitution of entering gases as to oxygen content, it cannot exceed a fixed figure which is characteristic of each particular temperature. Operating at any temperature at a chlorine concentration in the outgoing gases substantially less than that characteristic of that temperature results merely in lowering furnace output.

When the process is being applied in conjunction with operations which produce mixtures of ferrous chloride and nickel chloride or ferrous chloride and the chlorides of nickel, cobalt, etc., and when it is desired to oxidize the iron directly while admixed as ferrous chloride with the other chlorides, while retaining such other chlorides as such, then regardless of the needs of the system for make-up chlorine, I add to the air used in the oxidizing of the iron at least sufficient chlorine to prevent oxidation of nickel and/or the other non-ferrous chlorides present.

When so operating with ferrous chloride containing nickel and cobalt chlorides and when oxidizing the ferrous chloride at low temperatures to form iron oxid, and ferric chloride as a recovered chlorinating agent, it is possible by my process to render the cobalt oxid insoluble along with the iron, while maintaining the solubility and hence separability of the nickel chloride.

While it is usually best in selectively oxidizing a mixture of chlorides, say a mixture of nickel and cobalt chlorides, to control the concentration of chlorine in the ingoing air by recirculating without cooling a proper portion of the hot exit gases containing oxygen and chlorine, there is an alternative method which has great advantages when anhydrous nickel chloride or another anhydrous metal chloride is being roasted as another step. In such case I pass the dry preheated air over the nickel chloride or other chloride at a temperature slightly greater than that of the selective oxidation zone, before passing the air into such zone. This procedure makes quite certain the existence of an amount of chlorine in the air which will positively preclude the oxidation of any nickel chloride in the selective oxidizing zone.

The volume percentages of chlorine given above for various cases are correct only for oxygen at the concentrations found in air and are quite different with gases containing other percentages of oxygen as, for instance, with enriched air. The proper concentrations are influenced as well by the pressure of the gases, and from a practical standpoint by furnace details, rates of gas flow, desired degree of purity of the metals to be produced, etc. For this reason, I give below a practical rule for determining the chlorine concentration to be maintained in the ingoing gases. This rule will be seen to be a generalization of the specific method of preparing these gases set forth in the preceding paragraph. The rule is that when treating two chlorides $a$ and $b$ under a given fixed set of conditions,—temperature, pressure, oxygen concentration, etc.—for the purpose of oxidizing chloride $a$ and keeping $b$ unoxidized, the entering stream of air (oxygen containing gas) should contain that amount of chlorine which will be found in a stream of the same oxygen carrying gas after it has been passed slowly in effective contact with the chloride $b$ alone at a slightly higher temperature than that of the selective oxidation, other conditions being the same.

The proper rate of flow of the gases will necessarily depend upon the degree of perfection of contact between solids and gases provided by the apparatus and upon the facilities for maintaining uniform temperature. For any given set of chlorides there is a maximum percentage of chlorine in the exit gases at any given temperature and it is usually desirable to slow down the gas stream until this maximum is nearly attained, that is, until diminishing returns set in.

I claim:

1. The process of separating metals, which comprises reacting upon a mixture of oxidizable anhydrous metal chlorides with an oxidizing gas at a temperature promoting oxidation of the chlorides present and introducing sufficient chlorine to the reaction zone to inhibit oxidation of at least one of the chlorides of lesser reactability with oxygen while oxidizing the chlorides present having a greater reactability with oxygen.

2. In a process of separating metals, the steps which comprise contacting a mixture of oxidizable anhydrous metal chlorides at a controlled elevated temperature with an oxidizing gas containing a volume per cent. of chlorine slightly exceeding that volume per cent. of chlorine produced when said oxidizing gas unmixed with chlorine is contacted at said controlled temperature with that one of the chlorides that it is desired not to oxidize.

3. In a process of separating metals, the steps which comprise introducing a mixture of oxidizable anhydrous metal chlorides into an oxidizing zone, maintaining a controlled elevated temperature in said zone, passing an oxidizing gas admixed with a minor amount of chlorine through said zone, and inhibiting the oxidation of certain of the chlorides present while oxidizing other chlorides present, by so regulating the volume per cent. of chlorine introduced with the oxidizing gas that such volume per cent. will slightly exceed that volume per cent of chlorine produced when said oxidizing gas unmixed with chlorine is contacted at said controlled temperature with those chlorides that it is desired not to oxidize.

4. The process of separating nickel from more oxidizable metals, which comprises reacting upon a mixture of anhydrous chlorides of nickel and at least one of such metals with an oxidizing gas at a temperature promoting oxidation of the chlorides present, and introducing sufficient chlorine to the reaction zone to inhibit oxidation of the nickel chloride present.

5. The process of separating nickel from more oxidizable metals, which comprises bringing a mixture of the chlorides of nickel and at least one of such metals to the anhydrous state, passing a current of air admixed with chlorine into reacting relationship with said chlorides, regulating the amount of chlorine present and the temperature of the reaction zone within limits such that the oxidation of the non-nickel chlorides takes place to the substantial exclusion of the oxidation of the nickel chlorides, and separating the nickel chloride from the oxids formed.

6. In a process of separating nickel and cobalt the steps which comprise reacting upon a mixture of anhydrous chlorides of these metals with air at a temperature promoting oxidation of the chlorides present, and introducing sufficient chlorine to the reaction zone to inhibit oxidation of the nickel chloride present.

7. The process of separating nickel and cobalt comprising bringing a mixture of the chlorides of these metals to the anhydrous state, passing a current of air admixed with chlorine into reacting relationship with said chlorides, regulating the amount of chlorine present and the temperature of the reaction zone within limits such that the oxidation of the cobalt chloride takes place to the substantial exclusion of oxidation of the nickel chloride, and separating the nickel chloride from the cobalt oxid formed.

8. The process of separating nickel and cobalt, which comprises treating a mixture of the chlorides thereof in anhydrous form with an oxidizing gas in the presence of sufficient chlorine to inhibit oxidation of the nickel chloride while permitting oxidation of the cobalt chloride, separating the nickel chloride from the cobalt oxid, oxidizing said chloride in the presence of excess air, and leading the liberated clorine and the residual air in admixture into contact with further amounts of said chlorides.

9. The process of separating metals which comprises bringing a mixture of oxidizable metal chlorides to an anhydrous state, passing a current of air admixed with a minor amount of chlorine into reacting relationship with said chlorides, regulating the amount of chlorine present and the temperature of the reaction zone within limits such that the oxidation of certain chlorides present takes place to the exclusion of oxidation of other chlorides present and bringing the residual mixture of gases without cooling in contact with ferrous chloride to fix the oxygen and chlorine content of said mixture as ferric chloride and ferric oxid.

10. The process of separating nickel from other oxidizable metals which comprises reacting upon a mixture of anhydrous chlorides of nickel and at least one other of such metals at a controlled elevated temperature with an oxidizing gas containing a volume per cent. of chlorine slightly exceeding that volume per cent. of chlorine produced when such an oxidizing gas is contacted at said controlled temperature with nickel chloride alone.

11. In a process of separating nickel and copper the steps which comprise reacting upon a mixture of anhydrous chlorides of these metals with air at a temperature promoting oxidation of the chlorides present, and introducing sufficient chlorine to the reaction zone to inhibit oxidation of the nickel chloride present.

12. In a process of separating nickel and iron the steps which comprise reacting upon a mixture of anhydrous chlorides of these metals with air at a temperature promoting oxidation of the chlorides present, and introducing sufficient chlorine to the reaction zone to inhibit oxidation of the nickel chloride present.

RAYMOND G. BROWN.